United States Patent
Schimpe

(10) Patent No.: US 9,385,805 B2
(45) Date of Patent: Jul. 5, 2016

(54) SAFETY AND POWER CONTROL ARRANGEMENT AND METHOD FOR OPTICAL FIBER COMMUNICATION SYSTEMS

(75) Inventor: Robert Schimpe, Ottobrunn (DE)

(73) Assignee: Xieon Networks S.a.r.l., Luxembourg (LU)

( * ) Notice: Subject to any disclaimer, the term of this patent is extended or adjusted under 35 U.S.C. 154(b) by 236 days.

(21) Appl. No.: 13/062,575

(22) PCT Filed: Jun. 2, 2009

(86) PCT No.: PCT/EP2009/056745
§ 371 (c)(1),
(2), (4) Date: May 2, 2011

(87) PCT Pub. No.: WO2010/025966
PCT Pub. Date: Mar. 11, 2010

(65) Prior Publication Data
US 2011/0211829 A1    Sep. 1, 2011

(30) Foreign Application Priority Data
Sep. 5, 2008    (EP) .................................... 08105246

(51) Int. Cl.
*H04B 10/08*    (2006.01)
*H04B 10/079*    (2013.01)

(52) U.S. Cl.
CPC ...... *H04B 10/07955* (2013.01); *H04B 10/0791* (2013.01); *H04B 2210/08* (2013.01)

(58) Field of Classification Search
CPC .............. H04B 10/0791; H04B 10/07955; H04B 2210/08; H04B 10/152; H04B 10/2916; H04B 10/077; H04B 10/03
See application file for complete search history.

(56) References Cited

U.S. PATENT DOCUMENTS

| | | | |
|---|---|---|---|
| 5,278,686 A * | 1/1994 | Grasso et al. | 398/15 |
| 6,359,708 B1 * | 3/2002 | Goel | H04B 10/564 398/15 |
| 6,504,630 B1 * | 1/2003 | Czarnocha et al. | 398/15 |
| 6,807,001 B1 * | 10/2004 | Ranka et al. | 359/341.3 |
| 2006/0013583 A1 * | 1/2006 | Fukushi et al. | 398/18 |
| 2007/0098411 A1 | 5/2007 | Ghera et al. | |
| 2007/0121195 A1 | 5/2007 | Murakami et al. | |

FOREIGN PATENT DOCUMENTS

EP    1006682 A2    6/2000

* cited by examiner

*Primary Examiner* — Ken N Vanderpuye
*Assistant Examiner* — David Lambert
(74) *Attorney, Agent, or Firm* — Nelson Mullins Riley & Scarborough LLP

(57) ABSTRACT

Safety and power control arrangement and method for optical communication apparatus, where a first circuit pack emitting an optical signal (OS1) and at least a second and a third circuit pack (2, 3) are connected in series via optical fibers (4, 5). A power monitor (26) connected to an output (27) of the at least second circuit pack (2) reduces the signal power (PW2) output from the second circuit pack (2) to a pre-determined safe value if a loss-of signal monitor (34) of a next circuit pack (3) forwards a loss-of-signal control signal (LOC3). The advantage is that the maximum allowable value is achieved at the input of an interrupted fiber section and the non-interrupted circuits can still receive the optical signals with a reasonable power level.

18 Claims, 4 Drawing Sheets

SAFETY AND POWER CONTROL ARRANGEMENT AND METHOD FOR OPTICAL FIBER COMMUNICATION SYSTEMS

FIELD OF THE INVENTION

The invention relates to a safety and power control arrangement for optical fiber communication systems and a method therefore.

BACKGROUND OF THE INVENTION

In optical transmission systems optical signals are transmitted over an optical fiber. If the fiber is accidentally cut or disconnected and the optical signal would still be transmitted a service person would be harmed, if he happened to look at the concentrated light signal being emitted from the broken fiber. To avoid such harm, there is the need for a safety arrangement that automatically reduces the power of a light signal to avoid injuries. High optical power at the open fiber end must be also avoided before fiber resplicing or patchcord reconnecting.

The U.S. Pat. No. 6,359,708 B1 describes a facility which detects the loss of a high power optical signal in an optical transmission path and invokes a procedure which causes a transmitter connected to the cut fiber to reduce the power level of an optical signal emitted to a safe power level.

The same procedure may be applied to a multi stage amplifier if a connection between the stages is interrupted.

And the same safety arrangement is also necessary within an optical apparatus comprising a plurality of circuit packs (optical devices), which are connected via optical fibers. A possibility to avoid high optical power inserted into a broken fiber is to interrupt the line directly downstream of a transmitter/optical amplifier, or to shut down the transmitter/optical amplifier, or to strongly reduce the output power, if a LOS (loss-of-signal) is determined, or equivalently a "signal-present" of the signal, confirming a faultless connection, cannot be determined. If the fiber system is closed again, it is desirable that the signal-present signal is automatically detected and original power level is recovered. But especially in systems where the optical signal is split and sent to a plurality of circuit packs the strong reduction of power level of the transmitter results in interrupting or at least impairing all other connections.

Another possibility is to avoid an interruption and to control the power of the transmitter up to a predetermined safe value. Thereby the emitted power at the broken end further down the fiber is reduced to the safe power value or even below, and the power sent to other circuit packs may be far below a sufficient value required for signal transmission.

Therefore, in many cases, especially when a plurality of channels is transmitted, this method leads to not necessary impairments.

OBJECTS AND SUMMERY OF THE INVENTION

It is object of the invention to reduce the power of an emitted optical signal to an allowable amount if an optical fiber is interrupted, and to ensure that the optical signal can be transmitted with a reasonable power level via non interrupted fiber segments to non-affected circuits.

According to a first embodiment of the invention, there is provided a safety and power control arrangement for an optical communication apparatus with a first circuit pack emitting an optical signal, at least one further circuit pack, and at least one end circuit pack connected in series via optical fibers, at least one signal monitor for monitoring an output power of an output port of the at least one further circuit pack, a control device being designed for receiving control signals from a signal monitor of the at least further circuit pack and from further monitors of further downstream circuit packs, and being designed for decreasing the output power of the first circuit pack according to a power control signal of a signal monitor of said at least one further circuit pack receiving the optical signal till a measured output power of an optical signal emitted into an interrupted fiber is reduced to a save power value if loss-of-signal is determined for the next downstream circuit pack.

According to this invention an optical signal with a highest allowed power is always transmitted to the circuit packs.

Another embodiment comprises a splitter circuit pack, and at least a third and at least a fourth circuit pack connected via further fibers to outputs of the splitter circuit pack, the splitter circuit pack comprising a first signal monitor and an at least second signal monitor connected to its outputs, the control device being adapted for receiving control signals from the first signal monitor and the at least second signal monitor of the splitter circuit pack, and loss-of-signal control signals from at least third and fourth circuit packs, and being adapted for decreasing the output power of the first circuit pack according to a power control signal of a last signal monitor of the splitter circuit pack receiving the optical signal till a measured output power of an optical signal emitted into an interrupted fiber is reduced to a save power value if loss-of-signal is determined for at least one of the next down-stream circuit packs.

A further embodiment comprises a signal monitor designed for measuring the output power of the at least further circuit pack and to transmit a corresponding power control signal, and the control device is designed for determining loss-of-signal and a power control signal by comparing the received power signal with a predetermined value and for determining the output power level of said at least further circuit pack.

All decisions are made by the control device and the control device can be easy adapted to different systems.

Another embodiment comprises a signal monitor designed to compare the measured output power with a predetermined value and to transmit an overpower signal as a power control signal to the control device if the output power is too high or to low.

Binary valued control signals (bits) are sufficient, to transmit the information for optimization of the output power.

A further embodiment comprises advanced signal monitors for determining a loss-of-signal and to transmit a loss-of-signal control signal, and to measure the output power level, to compare the output power level with a predetermined value, and to transmit a power control signal meaning the output power is too high or too low.

The number of signal monitors can be reduced if the advanced signal monitor also calculates the output power levels of optical devices comprising splitters, which are arranged downstream of his measuring point. Control signals comprising two bits are sufficient to transmit the states loss-of-signal and overpower.

Another type of the advanced signal monitor may transmit the measured power level and the calculations and decisions may be done by the control device.

A safety and power control method for an optical communication apparatus with a first circuit pack emitting an optical signal, at least one further circuit pack, and at least one end circuit pack connected in series via optical fibers comprises the steps of monitoring loss-of-signal of an optical signal to be received by a circuit pack, if loss-of-signal is determined for a circuit pack:
measuring an output power of a next upstream circuit pack emitting this optical signal to be received and transmitting a power control signal to a control device, and
decreasing an output power of the first circuit pack till the measured output power of said optical signal emitted into an interrupted fiber is reduced to a save power value.

More details of the invention are described in further depending claims.

BRIEF DESCRIPTION OF THE DRAWINGS

Examples of the invention including a presently preferred embodiment are described below with reference to accompanying drawings, where.

DETAILED DESCRIPTION OF THE INVENTION

Figure 1:
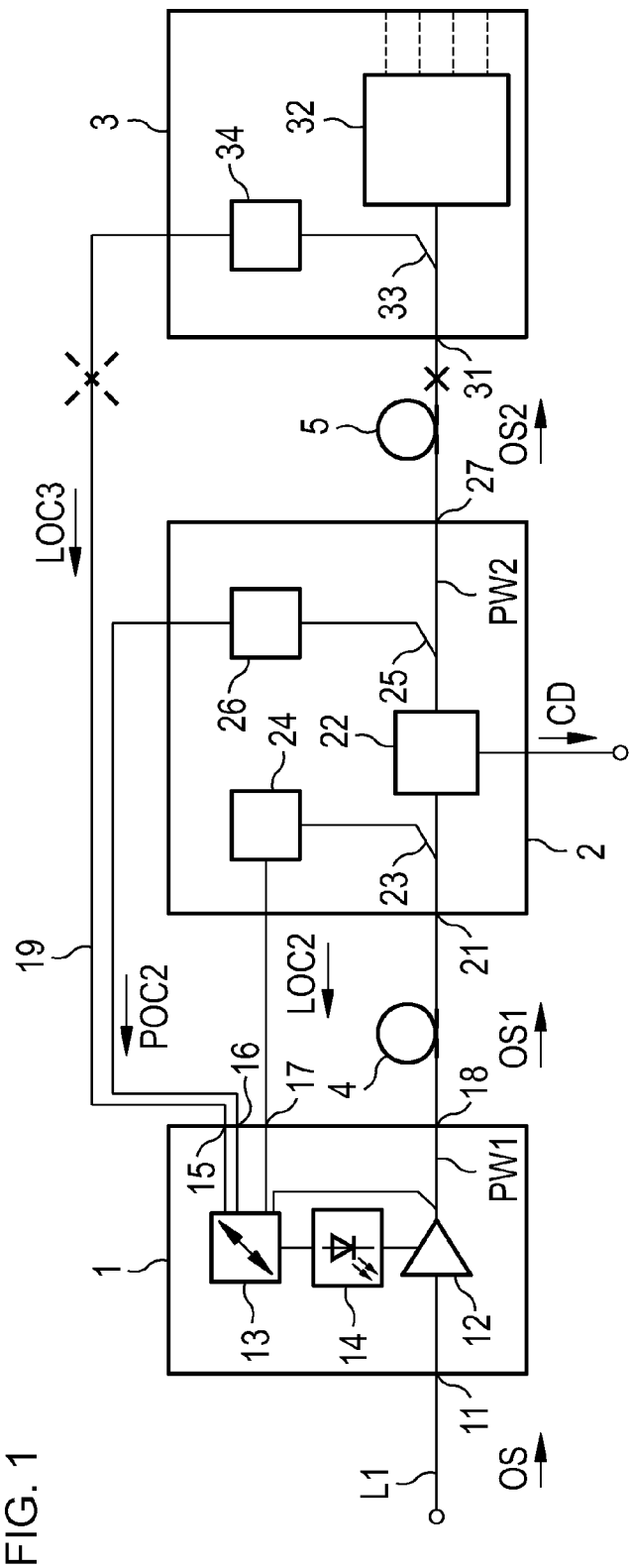
FIG. 1 is a schematic diagram of an optical transmission apparatus equipped with the safety and power control according to the invention.

FIG. 1 illustrates a simplified block diagram of a transmission apparatus comprising a safety and power control arrangement according to the invention with three circuit packs 1, 2, 3 connected in series. A first circuit pack (circuit assembly) 1 comprises, beside other equipment, an optical amplifier 12 and a control device 13 determining the output power PW1 of the optical amplifier 12 by controlling a pump source 14. An optical signal OS, e.g. a wavelength division multiplex signal, is received via a transmission fiber L1 at an input 11 of the first circuit pack 1 and amplified. The optical signal is denoted OS1, OS2, OS3, OS7 while travelling through the arrangement. A few channels of the optical signal; e.g. channel CD, may be dropped (here at an output port of circuit pack 2).

The output 18 of the first circuit pack 1 is connected via an optical fiber 4 to an input 21 of one further (second) circuit pack 2. This circuit pack 2 comprises an optical device 22, a loss-of-signal monitor 24 connected to the input 21 (or to another suitable point on the board), and a signal monitor 26, connected to the output 27 (or to another suitable point on the board after the last optical circuit). Both monitors 24, 26 are connected via splitters 23 and 25 to the optical waveguides/fibers 4 and 5 respectively transmitting the optical signal. The output signal of a circuit pack has in most cases a lower power level than the input signal because of the attenuation of passive elements like filters, splitters, add-drop-devices etc. within that optical device.

A plurality of these type further circuit packs 2, only one is shown in FIG. 1, may be connected in series. An output 27 of the further circuit pack 2 is connected via the optical fiber 5 to an input 31 of a last or an "end circuit pack" 3. A LOS monitor 34 is connected via a splitter 33 to the input 31 (or another suitable point). Here, the end circuit pack does not need a power monitor, because—presuming the apparatus is a receiver—the optical signal is determined and converted into an electrical signal by the circuit device 32, or because the device 32 is splitting the received optical signal into a plurality of optical tributary signals each having a uncritical power level from a laser safety point of view (dotted lines in FIG. 1).

The signal monitor 26 of the further/second circuit pack 2 sends its power control signal POC2 to the control device 13, preferable situated within the first circuit pack 1. The power control signal POC2 can be a measured power level or, after comparing the measured power level with a predetermined value, a (binary) "overpower" signal indicating that the power is too high or too low. The output power PW1 of the first circuit pack may be additional controlled by in internal control loop (connection from the amplifier output to the control device) to generate an accurate power signal.

The loss-of-signal monitors 24 and 34 send control signals LOC2 and LOC3 with (binary) logical information, e.g. via an electrical connection. The loss-off-signal is e.g. determined by measuring the power of the received optical signal.

If the optical fiber 4 between the first and the second circuit pack is interrupted, the loss-of-signal monitor 24 of the second circuit pack determines LOS (loss-of-signal). An emitted LOS control signal LOC2 is emitted and received at the control device 13 and decreases, independent of the power control signal POC2, the output power PW1 to an predetermined "allowed safe power value". The loss-of-signal is always generated if the monitored signal is lower than a threshold level.

An interrupted/open control line 19 (dashed cross) regularly transmitting a LOS control signal is also evaluated as LOS by the control device 13 to avoid malfunction.

Now it is assumed that the optical fiber 5 between the further/second circuit pack 2 and the end/third circuit pack 3 is interrupted (X in the drawing). A power control signal POC2 is emitted from the second circuit pack 2 and a LOS control signal LOS3 is emitted from the third circuit pack 3. The control signals are received by the control device 13 at inputs 15, 16, 17. The control device 13 selects the first LOS control signal LOC3 of the serial connection of the circuit packs, in this arrangement the LOS control signal LOC3 of circuit pack 3, and decreases the output power PW1 of the first circuit pack 1 controlled by the power monitor 26 of the second circuit pack 2. The optical output power PW2 of signal OS2 emitted into the interrupted fiber 5 is decreased to the allowed safe power value (or an other desired power limit). The "allowed safe power" is the allowed predetermined maximum light power inserted into an interrupted fiber. The foregoing packs, here only circuit pack 2 still receives the optical signal OS1 with sufficient or at least the highest possible power level while the power emitted into the interrupted fiber 5 does not exceed the allowed safe power value.

An equivalent signal-present control signal may be generated instead of the loss-of-signal control signal by the LOS monitors. The advantage is that supervision of an open control line is not necessary. If this signal-present control signal is not received because a control line 19 is interrupted or open, e.g. because the next downstream circuit pack 3 is missing, the signal-present control signal is not received by the control device and the output power is reduced.

The signal monitors may compare, as mentioned before, the output power with the 'allowed safe power value' and forward only an 'overpower' signal. If the optical fiber 5 is interrupted (or the third circuit pack 3 is missing) and LOS is received from the next downstream circuit pack 3 (or detected by the control device), the output power PW2 is decreased by the control device 13 till this 'overpower' control signal vanishes. If the output power is already lower than the safe power level it is not further decreased. The power measurement may be executed continuously or after determining LOS.

By way of example, the output power PW2 of the second circuit pack 2 is decreased to the safe power value within 1 second. If the reduction of output power PW2 to the safe power value is not executed within a guard time of 2 second because of a system failure, the output power PW1 of the first circuit pack is reduced to the safe power value automatically.

In a further embodiment the output power PW1 is increased again to the original power level not earlier than 10 seconds after detecting LOS, even if the loss-of-signal control signal has vanished earlier.

In a further improved embodiment, after the 'overpower' control signal has vanished, the original target power PW2 is slowly resumed after e.g. 1000 seconds.

Figure 2:
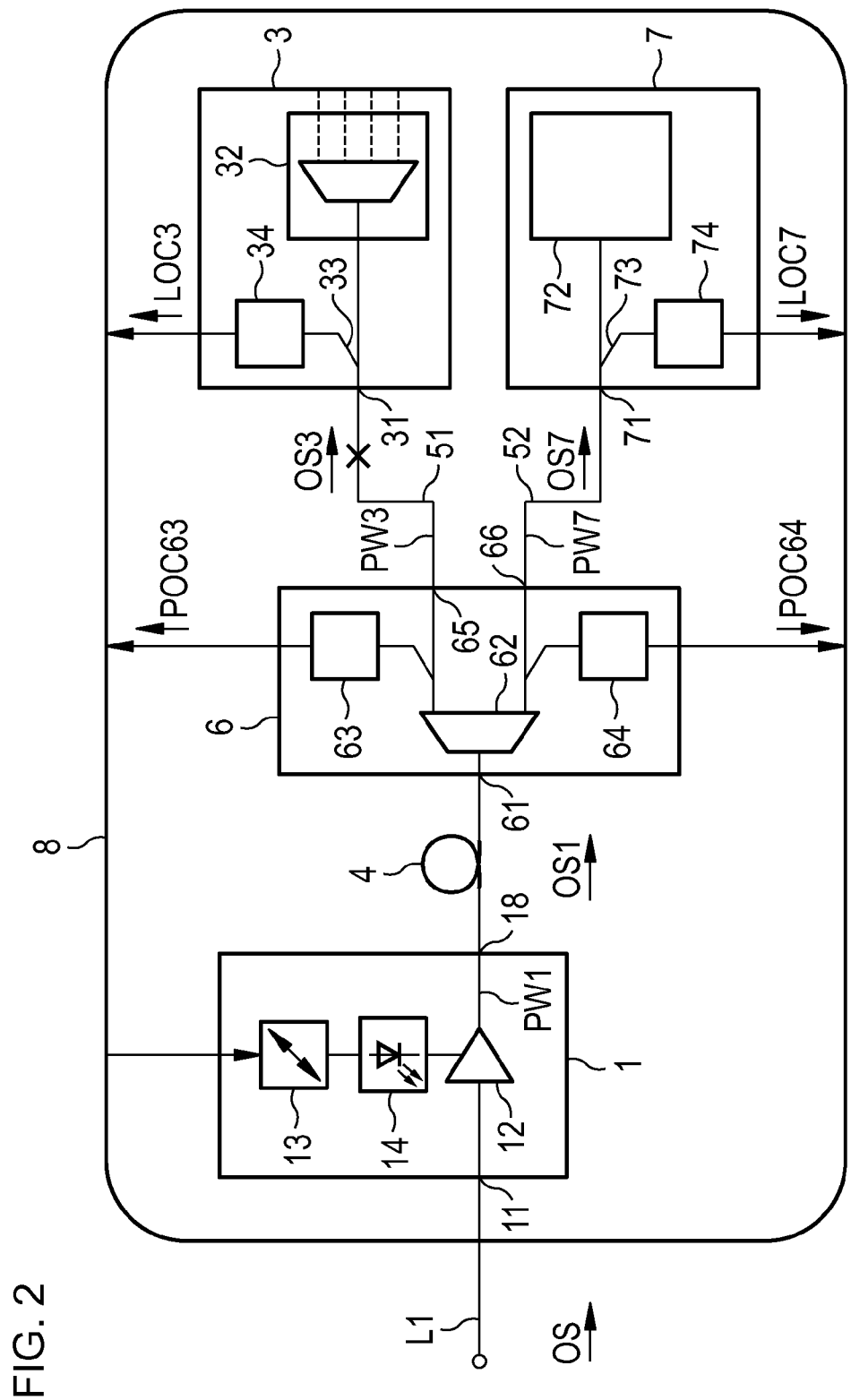
FIG. 2 is a schematic diagram of an optical transmission apparatus for distributing signals.

FIG. 2 illustrates a simplified block diagram of a further arrangement comprising the first circuit pack 1 with the optical amplifier 12 and the control device 13 and a modified further "splitter circuit pack" 6 connected to the output 18 of the first circuit pack 1. The splitter circuit pack 6 comprises an optical splitter 62 receiving at its input 61 the optical signal OS1. Outputs 65 and 66 of the modified splitter circuit pack 6 are connected by fibers 51 and 52 to inputs of 31, 71 of two further circuit packs 3 and 7, which may be end circuit packs.

The first circuit pack 1 has almost the same function as described before. The splitter 62 is e.g. a de-interleaver separating the channels of an optical wavelength division multiplex signal into two (or more) groups OS3 and OS7. Each group is forwarded to one of two downstream end circuit packs 3 and 4.

The splitter circuit pack 6 has two signal monitors 63 and 64, each connected to an output 65 and 66 respectively. Their power control signals POC63 and POC64 are forwarded to the control device 13, in this embodiment via a safety bus ring 8. A LOS monitor at the input is not necessary if no internal data processing is carried out within this circuit pack, as will be explained below.

Each end circuit pack 3 and 7 comprises only a LOS monitor 34 and 74 respectively. The received optical signals OS3 and OS7 are converted into electrical signals in the devices 32 and 72, or e.g. the devices 32 and 72 are optical devices splitting the received signals into a plurality of tributary signals each having a power level being low from a laser safety point of view.

If one of the LOS monitors 34 or 74 determines a LOS, e.g. LOS monitor 34 detects a LOS according to an interruption (X in the drawing) of the upper fiber 51, it forwards a LOS control signal LOC3 to the control device 13. Then the emitted signal power PW1 is reduced according to the power control signal POC63 of the associated upstream signal monitor 63 of splitter circuit pack 6. The control device decreases the output power PW1 till the power PW3 of signal OS3 emitted into the interrupted upper fiber 51 is reduced to the safe power level. The signal power PW7 in the other branch is unavoidable also reduced, but the associated power control signal POC64 is not taken into account, because there is no LOS control signal emitted (or a signal-present control signal is emitted) by the associated next downstream LOS monitor 74. According to different numbers of channels in both groups the total power in the undisturbed branch can be higher. Different signal power control circuits in the splitter circuit pack would allow an individual control of the output powers PW3 and PW7 but are usually not affordably.

If both LOS monitors 34 and 74 determine LOS, then it can be assumed that the fiber 4 is interrupted and the output power PW1 of the first circuit pack 1 is reduced to the predetermined safe power value. Also, the signal monitors 63 and 64 can also substitute a LOS monitor connected to the input of the splitter pack. If both report a level of about zero the output power PW1 is reduced to the safe level.

More than the shown circuit packs may be connected in series or in series and parallel. And also the branches may comprise two or more circuit packs connected in series. The control mechanism has to be adapted to the configuration. It is always the output power of the circuit pack upstream the interruption which has to be decreased to the predetermined safe power value and which is always controlled by the power monitor of that circuit pack inserting an optical signal into the interrupted fiber.

Figure 3:
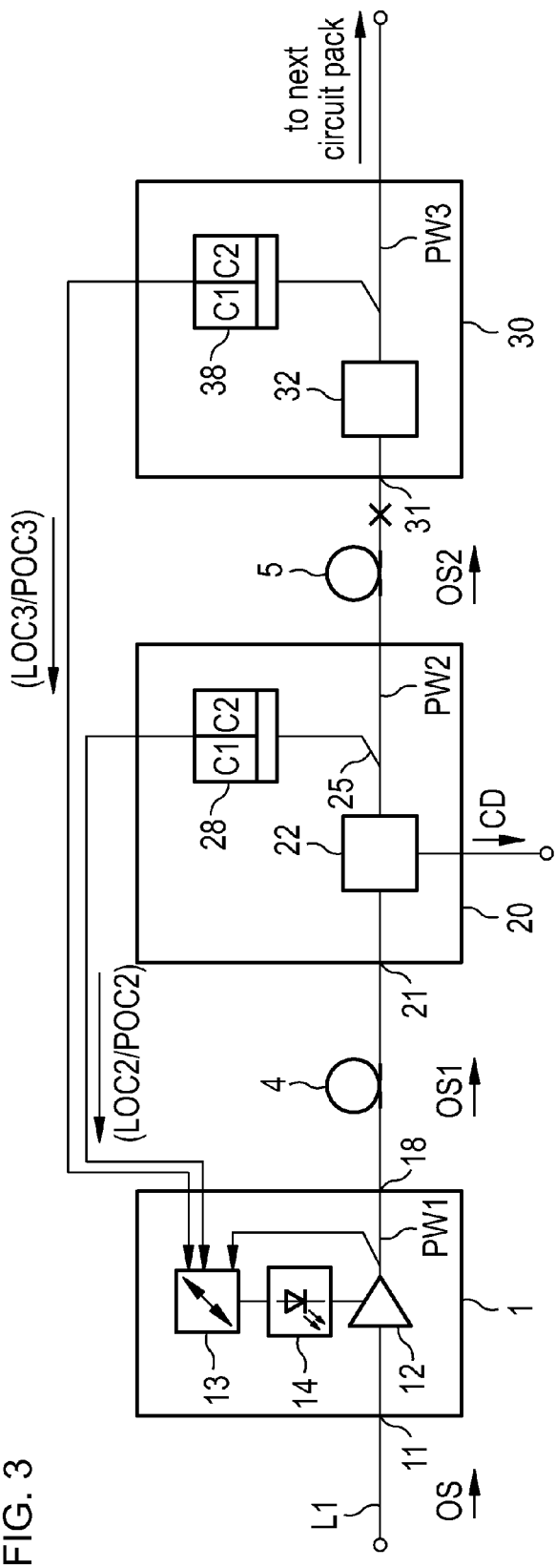
FIG. 3 is a schematic diagram of an optical transmission apparatus equipped with advanced signal monitors.

FIG. 3 shows a further embodiment of the invention. At least three circuit packs 1, 20, and 30 are connected in series.

Each further circuit pack 20, 30 comprises only one advanced signal monitor 28 and 38 respectively. The standard signal monitor supervises only the output power whereas the advanced signal monitor has two functions: To determine loss-of-signal (or signal-received) by a first comparator C1 and to supervise the output power (like the monitors of the splitter circuit pack) by a second comparator (or power measurement circuit) C2. Both control signals LOC2/POC2, LOC3/POC3 are derived by the advanced signal monitor and transmitted to the first circuit pack 1. Because the advanced signal monitor is connected to the output (or to a point suited to supervise the output power) this embodiment has in addition the advantage that also an interruption within the circuit pack 20 is detected.

Of course, another embodiment of the advanced signal monitor may transmit the measured power value. Then the control device 13 derives the LOS signal and a suitable control signal for power regulation itself. Both types of the advanced signal monitors can be also used in splitter circuit packs.

The LOS monitoring at the output has the advantage, that if fiber 4 or a connection on the second circuit pack 20 is interrupted—and the advanced signal monitor 28 determines LOS—the output power PW1 of the first circuit pack is reduced to the save power level.

And if fiber 5 or a connection on the third circuit pack 30 is interrupted—and the advanced signal monitor 38 determines LOS—the output power PW2 of the second circuit pack 2 is reduced to the save power value controlled by the advanced signal monitor 28.

Figure 4:
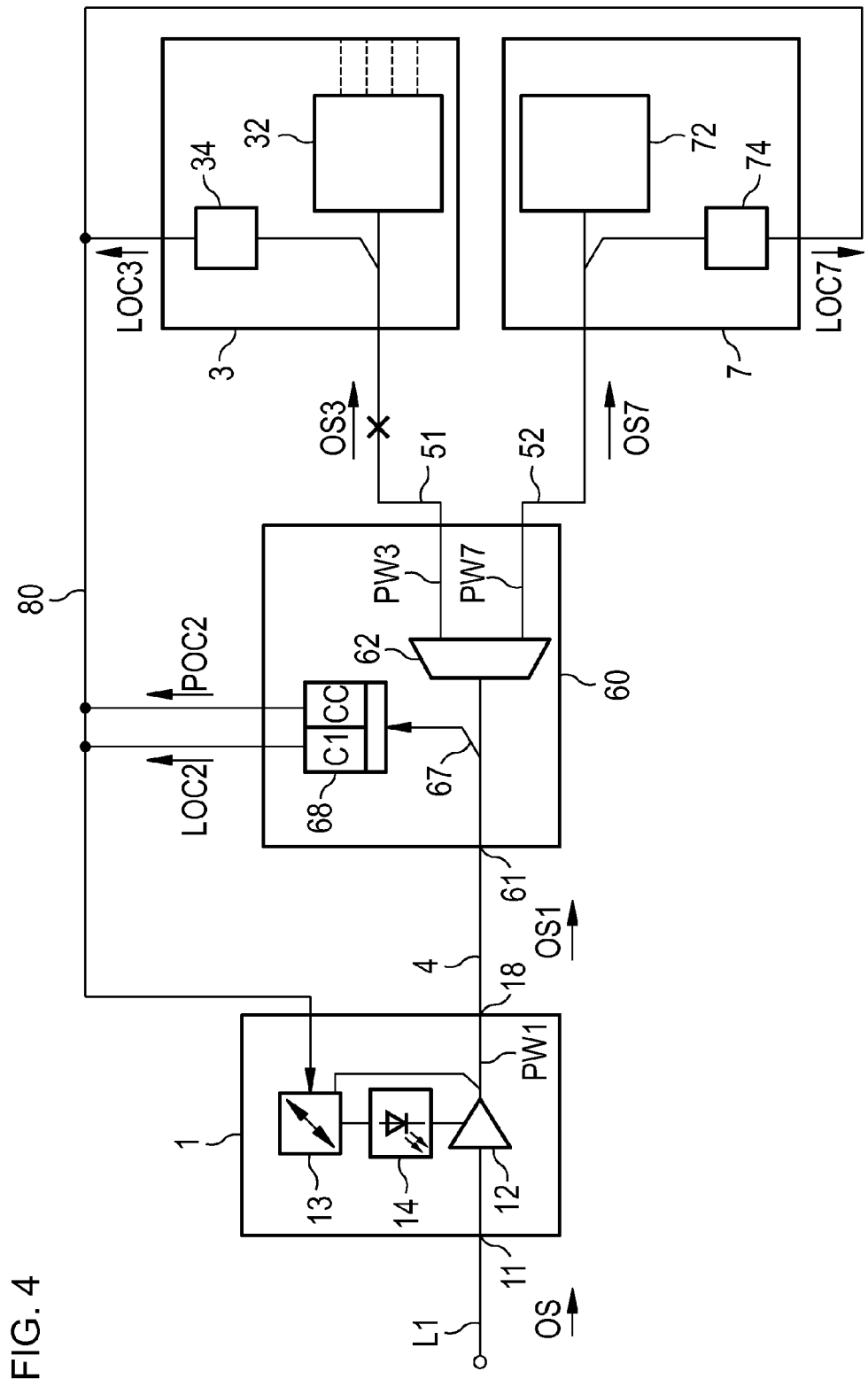
FIG. 4 is a further embodiment equipped with an advanced signal monitor.

FIG. 4 illustrates an arrangement with a splitter circuit pack 60. An advanced signal monitor 68 is connected to the input of a splitter device 62. This advanced signal monitor 68 supervises loss-of-signal and also measures the received power. If one of the fibers 51 or 52 is broken, e.g. 51, and LOS is reported from the following circuit pack, the output power PW3 is calculated by a calculation and comparison circuit CC of advanced signal monitor 68. This can be done because the attenuation of the splitter 62 (or another optical device) is known. All (binary) control signals LOC2, POC2 are forwarded via a control bus 80 to the control device 13 of the first circuit pack. Only a single signal monitor is necessary to control LOS and to control the powers PW3, PW7 of both (or more) outputs.

Of course, as mentioned before, also the measured power can be forwarded by the advanced signal monitor (and also by the LOS monitors) to the control device 13, which may derive the suitable control signals.

E.g. the monitor 34 on the end circuit pack 3 can also be an advanced type monitor, supervising downstream outputs (dashed lines) with respect to overpower.

As mentioned before, to avoid malfunctions a guard time may be allocated to the control signals. To avoid control problems of amplifiers/receivers allocated in the end circuit packs 32, 72 the output power of the first circuit pack is increased and/or decreased continuously or in small steps.

REFERENCE SIGNS 1 first circuit pack (CP)
11 input
12 optical amplifier (EDFA)
13 control device
14 pump source
15 control signal input
16 control signal input
17 control signal input
18 output
2 second CP
21 input
22 optical device
23 splitter
24 LOS monitor
26 splitter
25 power monitor
28 advanced signal monitor
3 third/last CP
31 input
32 optical/opto-electrical device
33 splitter
34 LOS monitor
38 advanced signal monitor
4 optical fiber
5 optical fiber
51, 52 optical fiber
6 splitter CP
61 input
62 splitter device/deinterleaver
63 power monitor
64 power monitor
65 output
66 output
60 splitter circuit pack with advanced signal monitor
7 circuit pack
71 input
72 opto-electrical device
73 splitter
74 LOS monitor
20 second circuit pack
30 third circuit pack
28, 38, 68 advanced signal monitor
OS, OS1 optical signal
OS2, OS3 optical signal
OS7 optical signal
C1, C2 comparator
CC calculation and comparison circuit
CD dropped channel
LOS LOSS OF SIGNAL
LOC2 LOS control signal of circuit pack 2
LOC3 LOS control signal of CP3
POC2 power control signal of circuit pack 2
POC63 first power control signal of CP6
POC64 second power control signal of CP6
PW1 output signal power of CP1
PW2 output signal power of CP2

The invention claimed is:

1. An optical communication apparatus, comprising:
a first circuit pack having a transmitter for transmitting an optical signal via an output;
a second circuit pack for receiving the optical signal from the first circuit pack via an input and outputting the optical signal via an output;
a first optical fiber connecting the output of the first circuit pack to the input of the second circuit pack for carrying the optical signal;
a third circuit pack connected in series with the first circuit pack and the second circuit pack for receiving the optical signal from the second circuit pack via an input;
a second optical fiber connecting the output of the second circuit pack to the input of the third circuit pack for carrying the optical signal;
at least one signal monitor of the second circuit pack for monitoring an output power of the second circuit pack;
a control device in the first circuit pack configured for:
receiving control signals from said at least one signal monitor of the second circuit pack; and
determining a loss of signal for the third circuit pack;
in response to the determining loss of signal for the third circuit pack, decreasing an output power of the first circuit pack according to a power control signal of said at least one signal monitor of the second circuit pack receiving the optical signal, until a measured output power of the second circuit pack coupling the optical signal into the second optical fiber is reduced to a safe power value such that a power level of the optical signal upstream of and including said second circuit pack is sufficient for signal transmission of the optical signal,
wherein the output power of the first circuit pack exceeds the output power of the second circuit pack.

2. The optical communication apparatus according to claim 1, wherein:
at least the second circuit pack includes a splitter circuit pack with at least two outputs, and at least the third and at least a fourth circuit pack are connected to said outputs of the splitter circuit pack via a ring bus or a bus;
the splitter circuit pack comprises a first signal monitor and a second signal monitor connected to said outputs;
said control device is adapted for receiving control signals from said first signal monitor and said second signal monitor of said splitter circuit pack and loss-of-signal control signals from the third and fourth circuit packs, and
said control device is configured to decrease the output power of the first circuit pack emitting the optical signal until a measured output power of an optical signal coupled into the second optical fiber is reduced to a safe power value, and
said control device is configured for decreasing the output power of the first circuit pack according to at least one power control signal of said monitors of said splitter circuit pack; and
said control device is configured to initiate the decreasing the output power of the first circuit pack if loss-of-signal is determined for at least one of the third and fourth circuit packs.

3. The optical communication apparatus according to claim 1, wherein:
said at least one signal monitor is configured for measuring the output power of the second circuit pack and to transmit a corresponding power control signal; and
said control device is configured for determining loss-of-signal and the power control signal by comparing the received power control signal with a predetermined value and controlling the output power of the second circuit pack.

4. The optical communication apparatus according to claim 1, wherein said at least one signal monitor is configured to compare the measured output power with a predetermined value and to transmit an overpower control signal to said control device if the output power is too high.

5. The optical communication apparatus according to claim 1, wherein the second circuit pack further comprises a separate loss-of-signal monitor transmitting a loss-of-signal control signal or a signal-present control signal.

6. The optical communication apparatus according to claim 1, wherein said signal monitor is configured as an advanced signal monitor for determining a loss-of-signal and to transmit a loss-of-signal control signal, and to measure the output power level, to compare an output power with a predetermined value, and to transmit in addition a binary power control signal indicating whether the output power is too high or too low, respectively.

7. The optical communication apparatus according to claim 1, wherein:
said at least one signal monitor is configured as an advanced signal monitor measuring the output power and transmitting a corresponding power control signal to the control device; and
said control device is configured to compare the power control signal with a predetermined value and to reduce the output power emitted into an open fiber to a safe power.

8. The optical communication apparatus according to claim 1, wherein said at least one signal monitor is configured as an advanced signal monitor for determining a loss-of-signal and to transmit a loss-of-signal control signal, and also for measuring a received signal power and to calculate an output power of the second circuit pack, to compare the at least one output power with a predetermined value, and to transmit a power control signal indicating that the at least one output power is too high or too low.

9. The optical communication apparatus according to claim 1, wherein the third circuit pack comprises only a loss-of-signal monitor.

10. The optical communication apparatus according to claim 1, wherein the output power of the first circuit pack is decreased to a predetermined safe value if loss-of-signal is determined for the third circuit pack.

11. The optical communication apparatus according to claim 2, wherein the output power of the first circuit pack is decreased to a predetermined power value if loss-of-signal is determined for any circuit pack connected to any of the outputs of the splitter circuit pack, said predetermined power value being defined to reduce the output power of an optical signal coupled into the second optical fiber to a safe power value.

12. The optical communication apparatus according to claim 2, wherein the output power of the first circuit pack is decreased to a predetermined safe power value, if any signal monitor of the splitter circuit pack transmits a power control signal indicating loss-of-signal.

13. The optical communication apparatus according to claim 1, wherein the control device is configured to respectively decrease and increase an output power continuously or in small steps.

14. The optical communication apparatus according to claim 1, wherein the control signals are transmitted via a ring bus or a bus.

15. The optical communication apparatus according to claim 1, wherein said control device is configured to evaluate an interrupted or open control line or open control bus regularly transmitting a control signal as loss-of-signal control signal.

16. The optical communication apparatus according to claim 1, wherein said at least one signal monitor generates a signal-present control signal instead of a loss-of-signal control signal if the optical signal is received.

17. A method for optical communication, the method comprising:
transmitting an optical signal via an output of a first circuit pack having a transmitter;
connecting the output of the first circuit pack to an input of the second circuit pack via a first optical fiber for carrying the optical signal;
receiving the optical signal from the first circuit pack via an input of the second circuit pack and outputting the optical signal via an output;
connecting the output of the second circuit pack to an input of a third circuit pack via a second optical fiber for carrying the optical signal;
outputting the optical signal from the second circuit pack to an input of the third circuit;
receiving the optical signal from the second circuit pack via the input of a third circuit pack connected in series with the first circuit pack and the second circuit pack;
monitoring loss-of-signal related to the optical signal to be received by the third circuit pack;
if loss-of-signal is determined for the third circuit pack:
measuring an output power of the second circuit pack outputting the optical signal to be received by the third circuit pack,
transmitting a power control signal to a control device in the first circuit pack; and
decreasing an output power of the first circuit pack until the measured output power of the second circuit pack coupling the optical signal into the second optical fiber is reduced to a safe power value such that a power level of the optical signal upstream of and including said second circuit pack is sufficient for signal transmission,
wherein the output power of the first circuit pack exceeds the output power of the second circuit pack.

18. The method according to claim 17, which further comprises transmitting control signals indicating loss-of-signal or signal-present control signals and power control signals to the control device.

* * * * *